May 16, 1967 K. D. YOST 3,319,968
REVERSE PRESSURE CARTRIDGE-TYPE FACE SEAL
Filed April 1, 1965
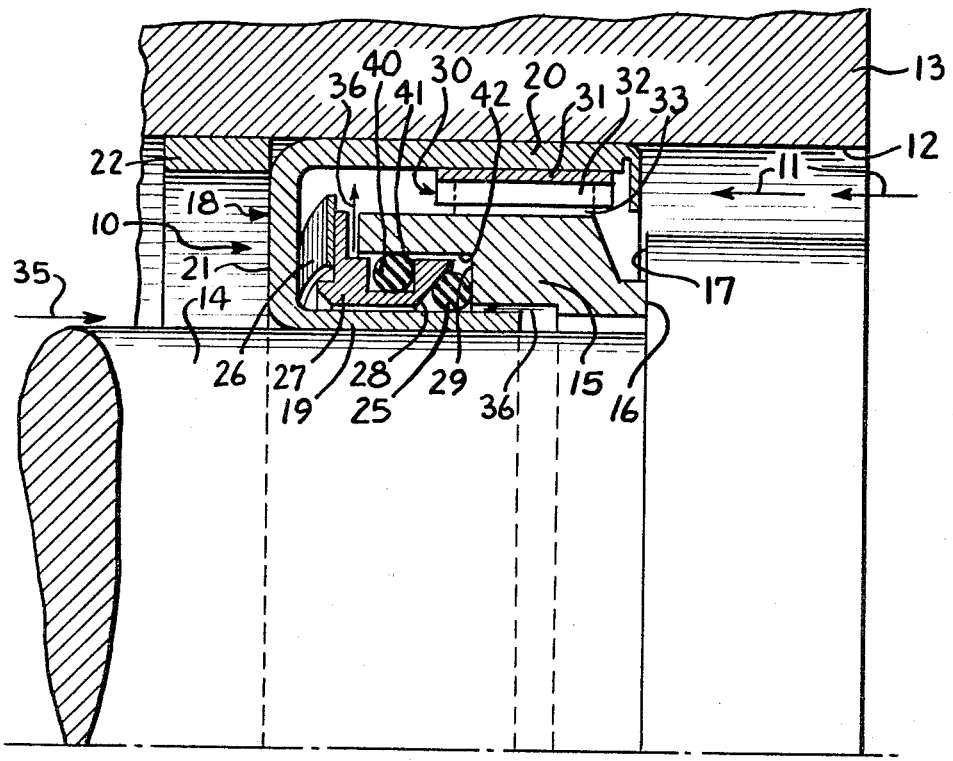
INVENTOR
KERMIT D. YOST
by: Wolfe, Hubbard, Voit & Osann
ATTYS.

3,319,968
REVERSE PRESSURE CARTRIDGE-TYPE FACE SEAL

Kermit D. Yost, Skokie, Ill., assignor to Continental Illinois National Bank and Trust Company of Chicago, trustee
Filed Apr. 1, 1965, Ser. No. 444,576
3 Claims. (Cl. 277—40)

This invention relates generally to rotary face seals and more particularly concerns an improved cartridge type seal construction capable of sealing against internal pressure reversals.

The primary aim of the present invention is to provide an improved cartridge type face seal in which the seal cartridge and its enclosed stator are effectively sealed against reverse pressure surges as well as against normal operating pressures.

It is also an object of the invention to provide an improved cartridge type face seal of the above type which replaces conventional seal constructions without requiring modification of the sealed parts.

More specifically, it is an object of the invention to provide a seal as characterized above which utilizes two simple, low cost O-rings which act as resilient sealing elements between the stator and the cartridge case during internal pressure reversals.

Another object is to provide a seal of the above description wherein the double O-ring arrangement permits a non-critical tolerance relationship between stator and cartridge case and which thereby is particularly well suited for economical, reliable manufacture, even when fabricating extremely small seals.

Other objects and advantages of the invention will become apparent upon reading the following detailed description and upon reference to the drawings, in which:

FIGURE 1 is a fragmentary longitudinal section of a rotary shaft assembly including a seal constructed in accordance with the invention.

While the invention will be described in connection with certain preferred embodiments, it will be understood that I do not intend to limit the invention to those embodiments. On the contrary, I intend to cover all alternatives, modifications and equivalents as may be included within the spirit and scope of the invention as defined by the appended claims.

Turning now to FIGURE 1, there is shown a rotary shaft assembly including a rotary seal 10 constructed in accordance with the invention. The seal 10 restricts fluid leakage in the direction of the arrows 11 through an opening 12 between a housing 13 and a relatively rotatable shaft 14. The seal 10 is of the face seal type and includes an annular stator 15 having a flat sealing surface 16 adapted to sealingly engage a shoulder 17 on the shaft 14.

The stator 15 is mounted in a cartridge case 18 which is an annular unit having opposed inner and outer cylindrical walls 19 and 20, respectively, between which the stator is loosely fitted. Preferably, the case 18 is formed as a single piece with an integral annular portion 21 spacing the opposed walls 19, 20. The case 18 thus permits the stator portion of the seal 10 to be handled as a unit and encloses and protects those elements of the seal which cooperate with the annular stator 15. The case 18 is held in the opening 12 and locked in place by a plate 22 which is secured to the housing 13.

Within the cartridge case 18 a first or primary resilient sealing member, preferably in the form of an O-ring 25, is fitted about the wall 19 adjacent the stator 15. The O-ring 25 is firmly pressed both against the wall 19 and the stator 15 so as to bias the sealing surface 16 against the shoulder 17 and also to provide a seal between the stator and the case 18. To urge the O-ring 25 against the stator 15 and against the inner wall 19, an annular wave spring 26 is enclosed within the housing 18 so as to bear against an annular washer 27 having an internally tapered nose portion 28 adapted to press against the O-ring 25. In the illustrated construction, the wave spring 26 which is disposed against the annular wall 21, urges the annular washer 27 to the right squeezing the O-ring 25 about the inner cylindrical wall 19 and also against an internal shoulder 29 formed on the stator 15.

In the illustrated embodiment, the stator 15 and the case 18 are locked against relative rotation by a flexible anchor member 30 which takes the form of a channel having a back 31 and generally parallel sides 32 (only one of which is shown). The back 31 of the channel 30 is secured to the wall 20 so that the sides 32 extend into a notch 33 formed in the periphery of the stator 15. The channel 30 thus forms a lug which keys the stator 15 to the surrounding case 20 and positively prevents relative rotation between the parts.

In conventional face seals the type thus far described it will be recognized that reverse pressure fluctuations as are indicated by the arrows 35 frequently overcome the spring force exerted by the wave spring 26 and thus the primary O-ring 25 is unseated from the shoulder 29 on the stator 15. With the primary O-ring 25 unseated in this manner, leakage may occur between the stator 15 and the housing 18 along the path indicated by the arrows 36.

In accordance with the present invention, the seal 10 is constructed to effectively block the escape of fluid due to reverse pressure surges along the path indicated by the arrows 36. As shown in FIGURE 1, the illustrative seal 10 encloses a secondary O-ring seal 40 carried in an annular groove 41 defined in the annular washer 27. The outer periphery of the O-ring 40 is maintained in contact with an inner cylindrical surface 42 of the stator 15 which overlies the washer 27. The secondary O-ring 40 thus seals the annular passage defined between the annular washer 27 and the cylindrical surface 42 of the stator 15.

It is a further feature of the present invention that even though the primary O-ring 25 may be unseated from the stator 15 by an internal pressure surge, nevertheless, the O-ring 25 effectively seals the space between the tapered nose 28 of the washer 27 and the inner annular wall 19 of the case 18. Thus, it will be appreciated that any movement of the principal O-ring 25 to the left as seen in FIGURE 1 simply compresses the O-ring against and increases the effectiveness of the seal between the tapered nose portion 28 and the inner annular wall 19. Moreover, since the secondary O-ring 40 is retained in the annular groove 41, any relative axial movement between the annular washer 27 and the stator 15 produces a rolling action of the secondary O-ring 40 along the cylindrical surface 42 thereby maintaining the effectiveness of the seal between the conical washer 27 and the stator 15.

When the internal pressure in the direction of the arrows 35, 36 decreases, the wave spring 26 again biases the conical washer 27 to the right as seen in the drawing and presses the primary O-ring 25 firmly against the stator shoulder 29 and the inner wall 19. With the primary O-ring in this position, the seal 10 operates to seal the passage 12 from leakage due to normal pressure in the direction of arrows 11.

Pursuant to another aspect of the present invention it will be appreciated that the primary O-ring 25 and the secondary O-ring 40 cooperate to provide a floating mounting for the stator 15 within the cartridge case 18 while maintaining an effective seal between the stator and the case. Thus, it will be appreciated that the effectiveness of the seal between the stator and the cartridge case is not dependent upon the maintenance of a critical dimensional relationship or tolerance between the stator 15 and the case 18. Similarly, since the conical washer 27 is also floatingly positioned by the O-rings 25, 40, between the stator 15 and the case 18, it is not necessary to machine the washer 27 to the same tolerance that would otherwise be necessary.

In view of the above, it will be appreciated that the seal 10 provides an effective cartridge type face seal well suited for applications where internal pressure reversals frequently occur. Thus, the O-ring 40 provides an effective secondary resilient seal between the stator 15 and the cartridge case 18 even when the primary O-ring 25 is unseated from the stator by an internal pressure surge. Moreover, since the stator 15 and the conical washer 27 are both floatingly mounted with respect to cartridge case 18 and with respect to one another by the O-rings 25, 40, these parts do not require the maintenance of critical dimensional relationship or tolerance with respect to one another.

I claim as my invention:

1. A rotary seal assembly comprising, in combination, an annular cartridge case defining opposed inner and outer cylindrical walls, an annular stator loosely fitted between said walls within said case, said stator having a sealing surface adapted to extend from said case and an annular shoulder adjacent said inner wall within said case, a first O-ring fitted against said inner wall within said case and adjacent said shoulder of said stator, an annular washer having an internally tapered nose portion adapted to press said first O-ring against said inner wall and said shoulder, means for biasing said annular washer against said first O-ring, said stator formed to define an internal cylindrical surface overlying said annular washer, means defining an annular groove between said cylindrical surface and said washer, and a second O-ring disposed in said groove and sealingly engaging said cylindrical surface and said annular washer.

2. A rotary seal assembly comprising, in combination, an annular cartridge case defining a cylindrical inner wall, an annular stator body loosely positioned adjacent said wall and within said case, an O-ring fitted against said inner wall within said case and adjacent said stator, means including an annular washer having an internally tapered nose portion for pressing said first O-ring against both said inner wall and said stator, said stator formed to define an internal cylindrical surface overlying said annular washer, and a second O-ring interposed between and sealigly engaging said cylindrical surface and said annular washer.

3. A rotary seal assembly comprising, in combination, an annular cartridge case defining a cylindrical inner wall, an annular stator body loosely positioned adjacent said wall and within said case, a first annular resilient sealing member fitted about said inner cylindrical wall within said case adjacent said stator, means including an annular washer for pressing said first sealing member against both said inner wall and said stator, said stator formed to define an internal cylindrical surface overlying said annular washer, and a second annular resilient sealing member interposed between and sealingly engaging both said cylindrical surface and said annular washer.

References Cited by the Examiner

UNITED STATES PATENTS

| | | | |
|---|---|---|---|
| 1,958,246 | 5/1934 | Olson | 277—87 |
| 2,871,039 | 1/1959 | Payne | 277—40 |
| 3,193,298 | 6/1965 | Voitck et al. | 277—40 |

SAMUEL ROTHBERG, *Primary Examiner.*